US009432620B2

(12) United States Patent
Apostolopoulos et al.

(10) Patent No.: US 9,432,620 B2
(45) Date of Patent: *Aug. 30, 2016

(54) DETERMINING A SYNCHRONIZATION RELATIONSHIP

(71) Applicant: Hewlett-Packard Development Company, L.P., Houston, TX (US)

(72) Inventors: John G. Apostolopoulos, Palo Alto, CA (US); Ramin Samadani, Palo Alto, CA (US); Mitchell Trott, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 46 days.

This patent is subject to a terminal disclaimer.

(21) Appl. No.: 14/616,402

(22) Filed: Feb. 6, 2015

(65) Prior Publication Data

US 2015/0156453 A1 Jun. 4, 2015

Related U.S. Application Data

(63) Continuation of application No. 12/883,150, filed on Sep. 15, 2010, now Pat. No. 8,988,489.

(51) Int. Cl.
*H04N 7/15* (2006.01)
*H04N 7/14* (2006.01)

(52) U.S. Cl.
CPC ............. *H04N 7/147* (2013.01); *H04N 7/142* (2013.01); *H04N 7/15* (2013.01)

(58) Field of Classification Search
CPC combination set(s) only.
See application file for complete search history.

(56) References Cited

U.S. PATENT DOCUMENTS

| | | |
|---|---|---|
| 4,885,638 A | 12/1989 | Bennett |
| 4,959,718 A | 9/1990 | Bennett |
| 5,400,069 A | 3/1995 | Braun et al. |
| 6,452,974 B1 | 9/2002 | Menon et al. |
| 6,554,433 B1 | 4/2003 | Holler |
| 6,956,871 B2 | 10/2005 | Wang et al. |
| 7,400,653 B2 | 7/2008 | Davies et al. |
| 7,496,229 B2 | 2/2009 | Zhang et al. |
| 7,599,561 B2 | 10/2009 | Wilson et al. |
| 7,690,795 B2 | 4/2010 | Cole et al. |
| 7,692,724 B2 | 4/2010 | Arora et al. |
| 8,000,005 B2 | 8/2011 | Kindler et al. |
| 2002/0063780 A1 | 5/2002 | Harman et al. |
| 2003/0002822 A1 | 1/2003 | Ishihara et al. |
| 2004/0143421 A1 | 7/2004 | Wang et al. |

(Continued)

OTHER PUBLICATIONS

Oliver Mimber e tla;The Visual Computing of Projector-Camera Systemd; International Conference on Computer Graphics and Interactive Techniques ~ 2008.

(Continued)

*Primary Examiner* — Joseph J Nguyen
(74) *Attorney, Agent, or Firm* — Mahamedi IP Law LLP (57) ABSTRACT

An example partially transmissive display is provided to output data to a user. The partially transmissive display can include a capture device to receive captured data transmitted through the partially transmissive display, and data generated on and/or reflected from the partially transmissive display. A cross-talk reduction component may be included to receive the captured data and a remote signal comprising displayed content on the partially transmissive display. The cross-talk component may utilize the remote signal and the captured data to reduce cross-talk and output a corrected signal to one or more remote participants.

15 Claims, 6 Drawing Sheets

(56) References Cited

U.S. PATENT DOCUMENTS

| | | |
|---|---|---|
| 2005/0042591 A1 | 2/2005 | Bloom et al. |
| 2007/0052801 A1 | 3/2007 | Shimamura |
| 2009/0207306 A1 | 8/2009 | Hagg |
| 2009/0278913 A1 | 11/2009 | Rosenfeld et al. |
| 2010/0033555 A1 | 2/2010 | Nagase et al. |
| 2010/0238274 A1 | 9/2010 | Kim et al. |
| 2011/0298933 A1 | 12/2011 | Yanowitz et al. |

OTHER PUBLICATIONS

Peter Lincoln et al;Multi-View Lenticluar Disply for Group Teleconferencing; Immerscom 2009.

201000696 OA—Aptina—White Paper—2010—6 pages.

J A Sanchez et al;Enhancing Interaction and Collaboration in Multimedia Rooms . . . ; ACM International Conference Proceeding Series vol. 378 ~ 2008;117-125.

Johnson et al., "Real-time projector tracking on complex geometry using ordinary imagery." Computer Vision and Pattern Recognition, 2007. CVPR'07. IEEE Conference on. IEEE, 2007.

Liao et al., "Robust and accurate visual echo cancelation in a full-duplex projector-camera system." Pattern Analysis and Machine Intelligence, IEEE Transactions on 30.10 (2008): 1831-1840.

Michel et al., "Synchronizing multimodal data streams acquired using commodity hardware." Proceedings of the 4th ACM International workshop on Video survellance and sensor networks. ACM, 2006.

Oliver Bimber et al.; The Visual Computing of Projector-Camera Systems; International Conference on Computer Graphics and Interactive Techniques ~ 2008.

Peter Lincoln et al;Multi-View Lenticular Disply for Group Teleconferencing; Immerscom 2009.

DETERMINING A SYNCHRONIZATION RELATIONSHIP

CROSS-REFERENCE TO RELATED U.S. APPLICATIONS

This Application is a Continuation of U.S. patent application Ser. No. 12/883,150, filed Sep. 15, 2010, entitled "Determining a Synchronization Relationship", which is incorporated herein by reference in its entirety.

BACKGROUND

Visual-collaborative systems provide a variety of benefits to users. Such benefits include natural interactivity between users, correct eye contact and gaze direction and media sharing, including gaze awareness (knowing where someone is looking) with respect to shared media. However, visual-collaborative systems are often afflicted by video cross-talk.

Video cross-talk is when content displayed for viewing by a local user is also captured by a camera for delivery to a remote user. Moreover, media streams that are not synchronized can make video cross-talk more complex.

Numerous attempts have been made to reduce video cross-talk, such as, various forms of multiplexing (e.g., temporal, wavelength (color), and polarization). However, these attempts often have performance and cost limitations.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Embodiments of the present invention are directed to visual-collaborative systems. Visual-collaborative systems enable groups or individuals to engage in interactive collaborative video communication. These visual-collaborative systems attempt to recreate the best aspects of actual face-to-face communications. It should be appreciated that a visual-collaborative system includes: a capture device such as a camera disposed at any location that is capable of capturing images and/or audio (e.g. images/audio of a user and/or associated objects) to be transmitted to a corresponding remote visual-collaborative system and a display screen configured to display images captured at a remote location and transmitted to a local visual-collaborative system.

Moreover, it is to be understood that a remote location can refer to a distant location, such as, another city. However, a remote location can also be a local location. For example, an adjacent room or even different locations within the same room. In this later case, there may be two or more people within the same room who use two or more visual-collaborative systems to collaborate together. This may be for work or entertainment, e.g., computer games.

Specific examples will follow in which visual-collaborative systems include a camera that captures images through a display screen. It will be understood that other visual-collaborative systems can include cameras at any location (as described above). However, for the purposes of brevity and clarity, examples of visual-collaborative systems will be used that capture images through a display screen.

Similarly, specific examples will follow in which visual-collaborative systems include a projector that projects images onto a back side of a display screen. It will be understood that other visual-collaborative systems can include a projector on the front side (e.g., same side as the user). Moreover, visual-collaborative systems may not include a projector and images are displayed solely by a partially transmissive display, such as a partially transparent organic light emitting diode (OLED) display screen. However, for the purposes of brevity and clarity, examples of visual-collaborative systems will be used that project images onto and through a display screen.

A discussion regarding embodiments of a visual-collaborative system is provided below. First, the discussion will describe the structure or components of various embodiments of visual-collaborative systems. Then the discussion will describe the operational description of the visual-collaborative system.

Figure 1A:
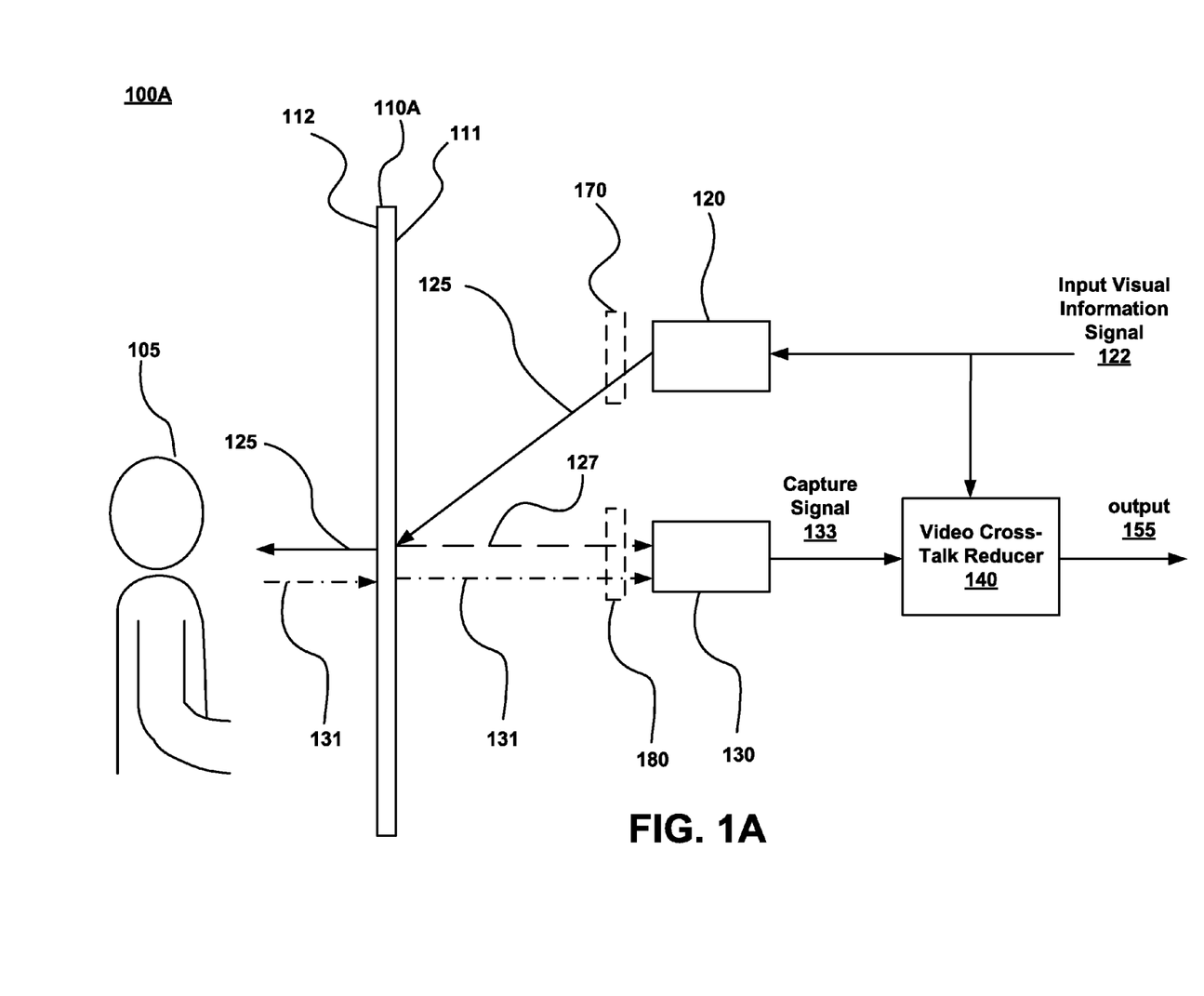
FIGS. 1A-B illustrate examples of a visual collaborative system, in accordance with embodiments of the present invention.

FIG. 1A depicts an embodiment of visual-collaborative system 100A, in accordance to an embodiment of the present invention. Visual-collaborative system 100A includes display screen 110A, projector 120, capture device 130 and video cross-talk reducer 140.

Projector 120 is configured to project images, via projected display signal 125, captured at a remote location onto display screen 110A. In one embodiment, input visual information signal 122 is received by projector 120 and subsequently projected through projector 120 as images onto display screen 110A.

Capture device 130 is configured to capture images for transmission to a remote location. For example, the captured images are transmitted to a corresponding visual-collaborative system at a remote location.

Display screen 110A is configured to display images captured at a remote location. In one embodiment, display screen 110A is a rear projection display screen comprising a holographic screen material that diffuses light striking a surface from specific angles corresponding to the projector direction.

In one embodiment, display screen 110A is a fog film. For example, viewers are able to view images projected onto a thin curtain of fog. In another embodiment, display screen 110A is a spinning mirror system. For example, multiple simultaneous viewers around the spinning mirror system are able to view images projected onto the mirrors.

Video cross-talk reducer 140 is configured to estimate video cross-talk that occurs on display screen 110A and captured by capture device 130. Video cross-talk reducer 140 is also configured to reduce the estimated video cross-talk from captured images by capture device 130, which will be described in detail below.

During use and operation of visual-collaborative system 100A, input visual information signal 122 (e.g., video signal transmitted from a remote location) is received by projector 120. Display signal 125 is projected by projector 120 onto first side 111 of display screen 110A. For example, the video signal received from the remote location is projected onto display screen 110A. Display signal 125 is transmitted through display screen 110A and viewed by user 105 on second side 112 of display screen 110A.

Capture device 130 captures light 131. In one embodiment, capture signal 133 is captured images (e.g., video signals). For example, capture signal 133 comprises, but is not limited to, user 105, any markings on display screen 110A and/or any objects in the vicinity of user 105.

Capture device 130 also captures backscattered light 127. Backscattered light 127 is reflected light of display signal 125 off of display screen 110A. As a result, video cross-talk is generated. As described above, video cross-talk is when back scattered light 127 is also captured by capture device 130 for delivery to a remote user.

Capture device 130 captures light 131 and backscattered light 127 and generates capture signal 133.

It is to be understood that display signal 125 exists in several forms: (1) internal to projector 120, as projected light; (2) as a component of backscattered light 127 (backscatter light 127 could also be display signal 125); and (3) as a component of capture signal 133.

In various embodiments, visual-collaborative system 100A employs optics and/or hardware to separate and remove the cross-talk signals. For example, visual-collaborative system 100A employs (1) time multiplexing, (2) polarization and (3) wavelength (color) division multiplexing.

In one embodiment, time multiplexing uses synchronized temporal multiplexing of video signals. In particular, projector 120 and capture device 130 are synchronized such that when projector 120 projects display signal 125, capture device 130 does not receive light 131 or 127. Similarly, when capture device 130 receives light 131, projector 120 does not project display signal 125. As a result, capture device 130 does not receive backscattered light 127 and video cross-talk is reduced. In one embodiment, time multiplexing is performed by generator lock (genlock) hardware.

However, this method is not incorporated with consumer-grade devices (e.g., off-the-shelf or legacy projectors and cameras). Even if professional-grade projectors and cameras provide the ability to be controlled by a synchronization signal, it would lead to very expensive hardware setups.

In various embodiments, visual-collaborative system 100A includes filters 170 and 180 to reduce video cross-talk. In one embodiment, filters 170 and 180 are orthogonal polarizing filters. For example, filter 170 filters out horizontally propagating light and filter 180 filters out vertically propagating light, or vice versa. As a result, video cross-talk is reduced.

However, approximately one half of display signal 125 is filtered out and not projected on display screen 110A. Similarly, approximately one half of light 131 is filtered out and not received by capture device 130. Other problems also occur, such as, it is very difficult to get perfect polarization-based alignment, and there is generally some amount of light leakage which results in cross talk. Accordingly, performance of visual-collaborative system 100A is diminished.

In another embodiment, filters 170 and 180 are multiple pass band optical filters that separate the video signals by their light wavelength. For example, filter 170 filters out the lower half of the color spectrum and filter 180 filters out the upper half of the color spectrum, or vice versa. As a result, video cross-talk is reduced.

However, similar to the polarizing filters, approximately one half of display signal 125 is filtered out and not projected on display screen 110A. Similarly, approximately one half of light 131 is filtered out and not received by capture device 130. Accordingly, performance of visual-collaborative system 100A is diminished.

In one embodiment, video cross-talk reducer 140 is configured to reduce video cross-talk without requiring optical hardware and/or synchronization hardware methods. For example, video cross-talk reducer 140 is able to reduce video cross-talk based on signals rather than using hardware optical elements (e.g., polarization and wavelength multiplexing) and synchronization (e.g., genlock) hardware. In another embodiment, video cross-talk is reduced by the combination of (1) video cross-talk reducer 140 and (2) optical hardware and/or synchronization hardware methods.

It should be appreciated that projector 120 and capture device 130 may be simple off-the-shelf or legacy play back and image capture devices. Moreover, projector 120 and capture device 130 do not require any revision of hardware and/or software in order to facilitate in video cross-talk reduction as described herein.

Projector 120 (or other display device) may consist of a cascade of modules that subject their respective inputs to algorithmic transformation before being passed to the next module, and ultimately to a final display module. For example, a single input frame may be converted into several frames via color separation. It should be appreciated that input visual information signal 122 may be the input to projector 120, or it may be the input to any intermediate module, for example the final display module.

In general, video cross-talk reducer 140 is able to reduce video cross-talk by forward modeling input visual information signal 122 propagating through visual-collaborative system 100A. For example, video cross-talk reducer 140 forward models (e.g., estimates) how input visual information signal 122 is propagated through projector 120 and captured as video cross-talk at capture device 130. Once video cross-talk is properly forward modeled, it is then reduced (e.g., subtracted) from the actual video cross-talk captured at capture device 130. Then output 155 is generated and subsequently transmitted to a remote location.

In particular, the following is accounted for to properly forward model the video cross-talk: (1) mapping from digital input (e.g., input visual information signal 122) to projector 120 to projected display signal 125; (2) mapping from display signal 125 through visual-collaborative system 100A to light 127 hitting a camera sensor (accounting for color correction, grayscale correction, geometric correction, spatially-varying black-level offset and gain; and spatial-varying blur); and (3) mapping from light received (e.g., back scattered light 127) by capture device 130 to capture signal 133.

In one embodiment, the forward model is implemented as a closed loop model that maps directly from input visual information signal 122 to capture signal 133.

In one embodiment, shown in FIG. 1A, video cross-talk reducer 140 is able to reduce video cross-talk based on signals because of the following principles regarding light. The linearity of light means that the radiance emerging from first surface 111 (e.g., the back of the display screen 110A) is, $$s(x,y,t)=s_p(x,y,t)+s_d(x,y,t), \quad (1)$$

where continuous signal s(x, y, t) represents radiance, composed of two terms: (1) $s_p(x, y, t)$ (e.g., back scattered light 127) from the video of the remote participant displayed by projector 120, and resulting in the cross-talk signal in capture device 130, and (2) from the desired light $s_d(x, y, t)$ (e.g., light 131) coming from a room, containing user 105 on side 112 of display screen 110A. In one embodiment, at capture device 130, because of polarizing filters 170 and 180, the two signals are attenuated differently, but linearity continues to hold if capture device 130 is controlled and its linearity enforced by setting the camera gamma to the identity.

The resulting video frames at capture device 130 are given by, $$c(n_1,n_2,k)=c_p(n_1,n_2,k)+c_d(n_1,n_2,k), \quad (2)$$

where the functions c( ), $c_p$( ) and $c_d$( ) are 3-color functions of discrete spatial indices $n_1$ and $n_2$ and discrete temporal index k (color index not indicated for simplicity).

In one embodiment, input visual information signal 122 comprises a sequence of input frames $p(m_1, m_2, k)$. The inputs to video cross-talk reducer 140 are the corrupted signal $c(n_1, n_2, k)$ (e.g., capture signal 133) and a short sequence of input frames $p(m_1, m_2, l)$ for $l \in [l_{min}(k), l_{max}(k)]$. The output (e.g., output 155) is an estimate of the desired $c_d(n_1, n_2, k)$.

Linearity allows the solving of the signal subtraction problem for any arbitrary interfering cross-talk signal. In one embodiment, the entire view of capture device 130 contains a desired signal as well as cross-talk and it is not possible to segment the cross-talk artifacts for removal.

In one embodiment, the forward model f( ) is a transformation from input signals $p(m_1, m_2, l)$ to camera cross-talk signal $c_p(n_1, n_2, k)$, which is used to subtract the estimated signal $ĉ_p(n_1, n_2, k)=f(p(m_1, m_2, l))$ from Equation 2. In another embodiment, forward model f( ) is a transformation from a single input frame (e.g., input visual information signal 122) to capture signal 133.

To obtain desired video cross-talk reduction, photometric, geometric and optical factors that comprise f( ) are characterized. In addition to forward modeling, video cross-talk reduction (e.g., subtraction) is desired to provide the cross-talk reduced signals to the remote participants.

In contrast, conventional technology in projector-camera modeling has developed inverse models to modify multiple projector input signals to result in uniform and well-blended signals on a screen. The camera is used incidentally to characterize the inverse model but the camera is not used during operation.

Figure 1B:
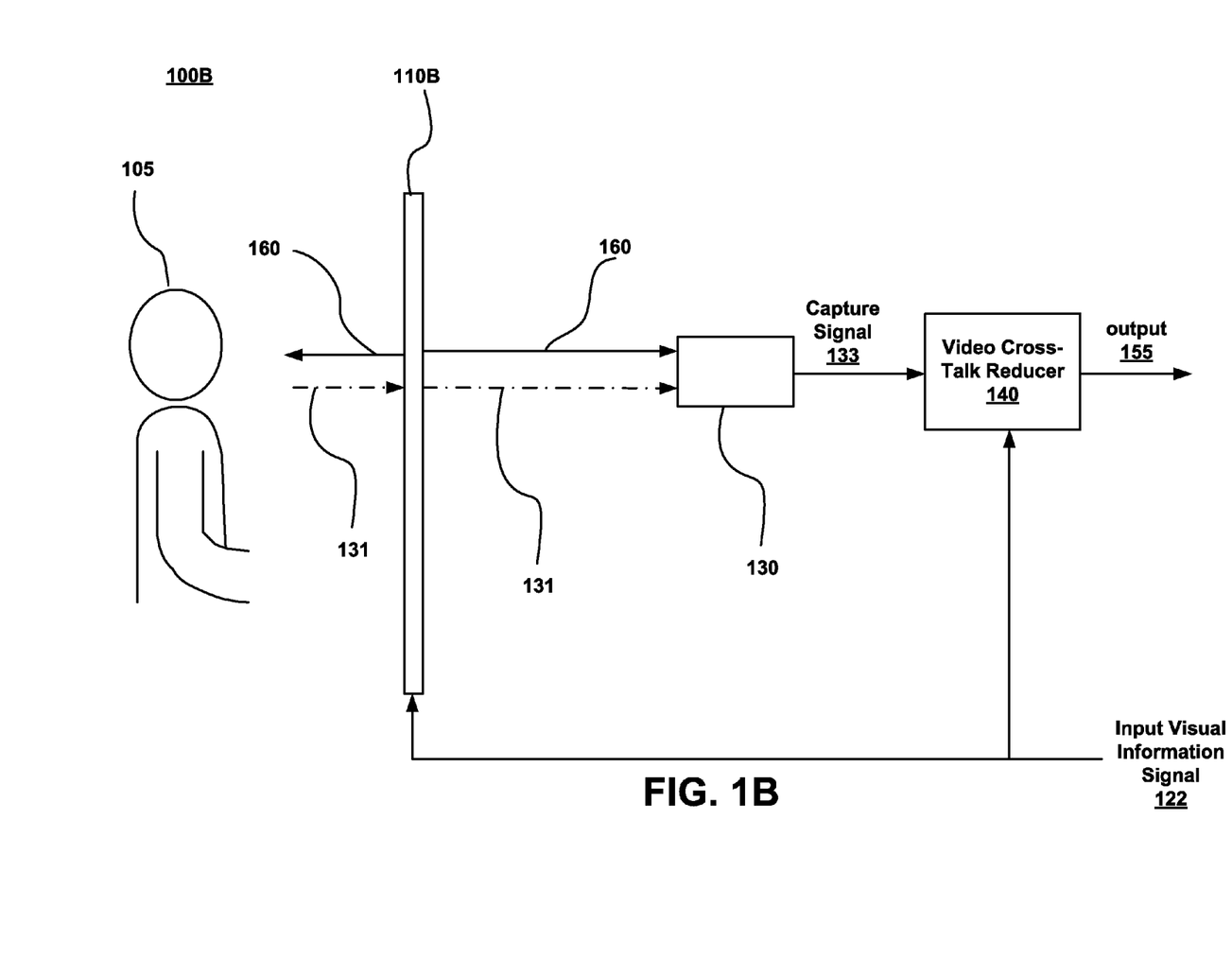

FIG. 1B depicts an embodiment of visual collaborative system 100B. Visual collaborative system 100B operates similarly to visual collaborative system 100A, however, visual collaborative system 100B includes display screen 100B. Unlike display screen 110A, display screen 110B does not require a projector for images to be displayed to user 105. This display screen can directly display content on the screen. This display screen also has the ability to be partially transmissive. For example, this may be a partially transparent organic light emitting diode (OLED) display screen.

During use and operation of visual-collaborative system 100B, capture device 130 captures light 131 and light 160 that is displayed on display screen 110B. As a result of capturing light 131 and light 160 that is displayed on partially transparent display screen 110B, video cross-talk is generated.

In general, video cross-talk reducer 140 is able to reduce video cross-talk by forward modeling input visual information signal 122 propagating through visual-collaborative system 100B. For example, video cross-talk reducer 140 forward models (e.g., estimates) how input visual information signal 122 is propagated through partially transparent display screen 110B and captured as video cross-talk at capture device 130. Once video cross-talk is properly forward modeled, it is then reduced (e.g., subtracted) from the actual video cross-talk captured at capture device 130. Then output 155 is generated and subsequently transmitted to a remote location.

Figure 2:
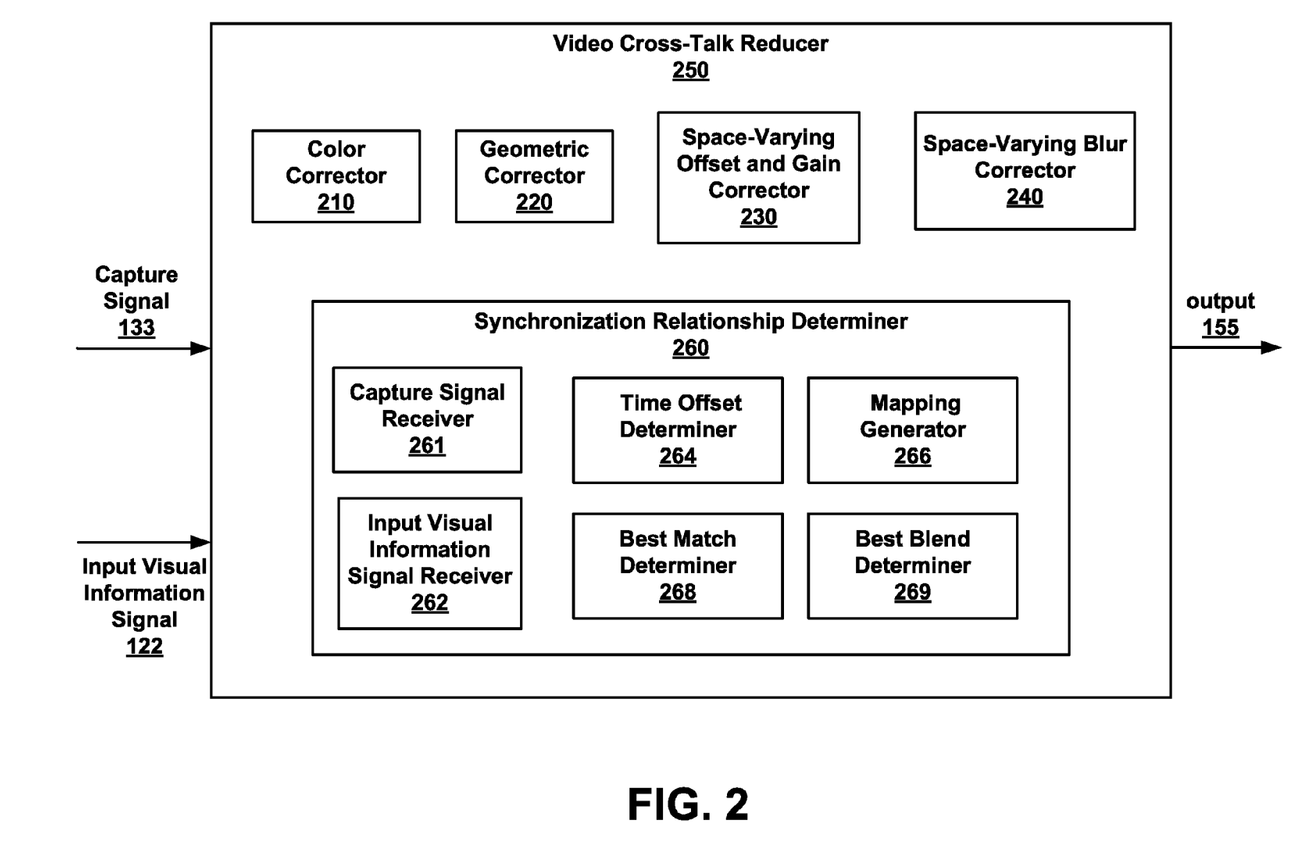
FIG. 2 illustrates an example of a video cross-talk reducer, in accordance with an embodiment of the present invention.

FIG. 2 depicts video cross-talk reducer 250 in accordance to an embodiment of the present invention. Video cross-talk reducer 250 forward models (e.g., estimates) how input visual information signal 122 is propagated through projector 120 and captured as video cross-talk at capture device 130. Once video cross-talk is properly forward modeled, it is then reduced (e.g., subtracted) from the actual video cross-talk captured at capture device 130, as presented above. In one embodiment, video cross-talk reducer 250 uses static (time-invariant) characterizations of: 1) color transformation; 2) geometric transformation; 3) space-varying color gain and offset, and 4) space-varying blur. In a more general case, the characterization may be performed periodically, or continuously, depending on the time-varying nature of the characteristics.

In particular, video cross-talk reducer 250 includes color corrector 210, geometric corrector 220, space-varying offset and gain corrector 230 and space-varying corrector 240 to estimate the different parameters of f( ). In various embodiments, video tests are sent to projector 120 to estimate the different parameters of f( ). In one such embodiment, the test patterns include, but are not limited to, color patches, grid patterns, horizontal and vertical stripes, and uniform white, black and gray level signals. In another such embodiment, the video test patterns are sent while the room is dark. This calibration may also be performed during manufacture and before shipping.

Space-varying offset and gain corrector 240 is configured to account for and correct space-varying black level and space-varying brightness. For example, by averaging captured uniform white video frames and black video frames, (spatially-varying) white response, $W(n_1, n_2)$, and the black response, $B(n_1, n_2)$, of visual-collaborative system 100A is determined. For input $c_i(n_1, n_2, k)$, (normalized to be in the range [0,1]) the output is given by, $$c_o(n_1,n_2,k)=c_i(n_1,n_2,k)[W(n_1,n_2)-B(n_1,n_2)]+B(n_1,n_2). \quad (3)$$

Color corrector 210 is configured to provide color transformation. For example, in one embodiment, given the gain offset transformation (as described above), a global color transformation is determined by fitting between measured colors and color values $c_f(\ )$ generated using the inverse of Equation 3.

Measured average color values for gray input patches are used to determine 1D lookup tables applied to the input color components, and measured average color values for primary R, G, B inputs are used to determine a color mixing matrix using the known digital input color values. Determining the fits using the spatially renormalized colors allows the color model to fit the data with a small number of parameters.

Geometric corrector 220 is configured to provide geometric transformation. In one embodiment, geometric transformation is determined using a traditional multidimensional polynomial transformation model.

Space-varying blur corrector 240 is configured to account for and correct space-varying blur. In one embodiment, space-varying blur corrector 240 is utilized to obtain good results at edges in the cross-talk signal. If space-varying blur 240 is not utilized, objectionable halo artifacts remain visible in output 155.

The parameters of the space-varying blur are determined by estimating separable blur kernels in the horizontal and vertical directions. Captured horizontal and vertical step edges at different locations in the frames are fit using scaled erf error functions. The standard deviations a of best fit are also the parameters for the space-varying Gaussian blurs that are applied. In one embodiment, the range of values found are $\sigma \in [1, 4]$. In another embodiment, the sparsely sampled blur estimates, 50 points each for horizontal and vertical estimates, are interpolated to a spatially dense set of horizontal and vertical blur parameters, $\sigma_h(n_1, n_2)$ and $\sigma_v(n_1, n_2)$.

Direct implementation of space-varying blur, $$c_b(n_1, n_2) = \sum_{n'_1, n'_2} G(n_1, n_2, n'_1, n'_2) c_u(n'_1, n'_2) \quad (4)$$

can be expensive. Accordingly, methods have been modified (to provide unity gain filters) where space-varying Gaussian filters of arbitrary width are approximated by a linear combination of space invariant Gaussian filters of predetermined width.

Thus, the linear (but shift variant) operation of Equation 4 is approximated by, $$c_b(n_1, n_2) \approx \sum_i \alpha_i(n_1, n_2) \sum_{n'_1, n'_2} G_i(n_1 - n'_1, n_2 - n'_2) c_u(n'_1, n'_2). \quad (5)$$

In one embodiment, i=4, so that four separable convolutions are followed by pixel-wise linear combination with weights $\alpha_i(n_1, n_2)$ that are predetermined for efficiency.

Figure 3:
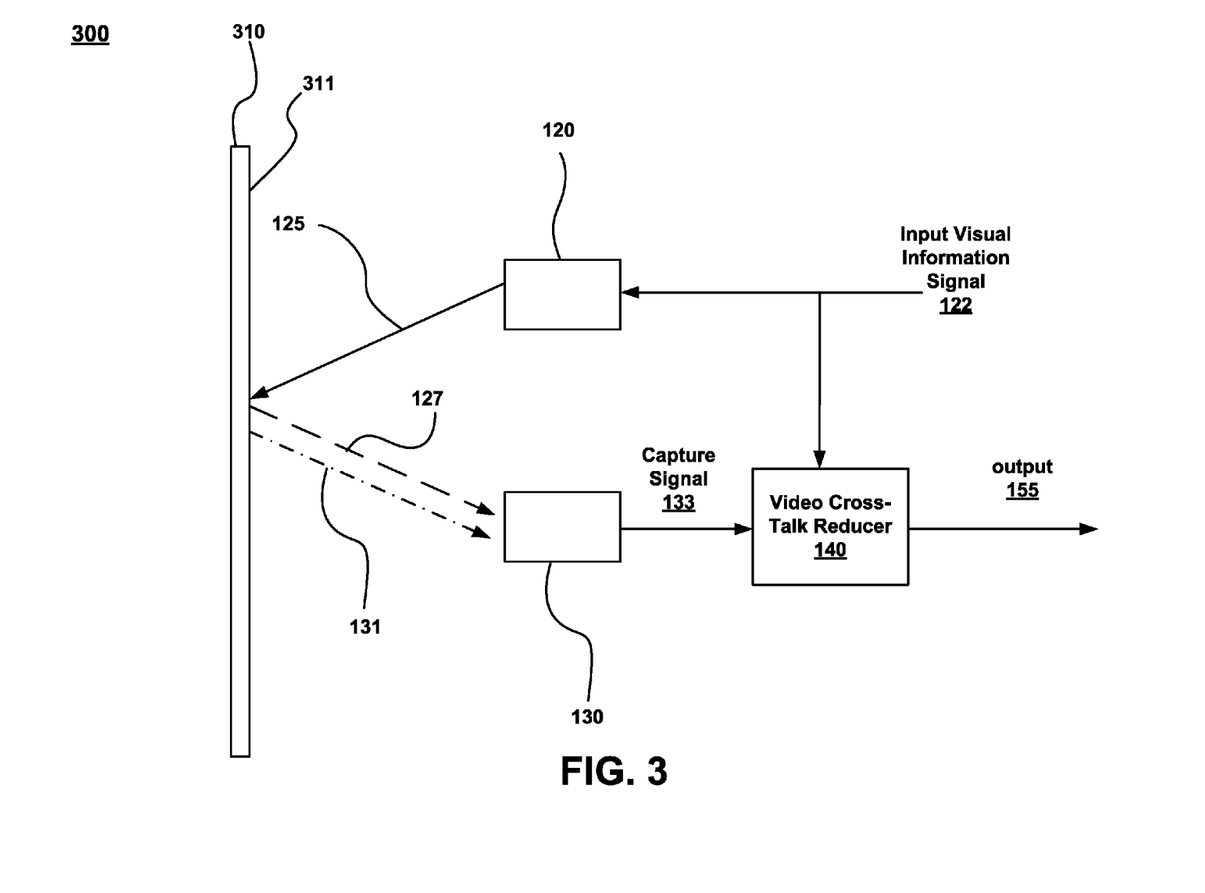
FIG. 3 illustrates an example of a visual collaborative system, in accordance with an embodiment of the present invention.

FIG. 3 depicts an embodiment of visual-collaborative system 300, in accordance to an embodiment of the present invention. Visual-collaborative system 300 operates similarly to visual-collaborative system 100A, however, visual-collaborative system 300 includes a whiteboard 310 (e.g. non-transparent display screen) rather than a see-through display screen 110A.

Accordingly, during use, projector 120 projects display signal 125 onto the front side 311 of whiteboard 310. Capture device 130 captures light 131 (e.g., written text on whiteboard 310) and backscattered light 127 (e.g., reflectance of whiteboard 310) and generates capture signal 133.

As described above, in various embodiments, video cross-talk reducer 250 (or 150) generates output 155 by reducing an estimated video cross-talk from capture signal 133. For example, the additive model of the portions of projected light of the remote scene and the light from the locally captured scene shown in the embodiment of FIG. 3 can be described as:

$$c(x,t) = p(x,t) + l(x,t), \quad (6)$$

where $c(x,t)$ is the camera signal, $p(x,t)$ is portion of light projected by the projector and $l(x,t)$ is the portion of light due to the local scene (e.g., light reflected from user). After a forward model of $p(x,t)$ is determined, it is reduced or subtracted out of $c(x,t)$.

In another embodiment, video cross-talk reducer 250 generates output 155 by reducing an estimated video cross-talk generated from projector 120 projecting display signal 125 onto whiteboard 310. Accordingly, an "idealized" model of the projected light and light of the whiteboard writing is:

$$c(x,t) = p(x,t) w(x,t), \quad (7)$$

where $c(x,t)$ is the camera signal, $p(x,t)$ is portion of light projected by the projector and $w(x,t)$ is the reflectance of the white board, including written text on the white board, for example. In other words, camera signal $c(x,t)$ is light of the projector $p(x,t)$ multiplied by the reflectance of the whiteboard $w(x,t)$. After a forward model of $p(x,t)$ is determined, it is reduced or subtracted out of $c(x,t)$.

In another embodiment, video cross-talk reducer 250 generates output 155 by reducing an estimated video cross-talk generated from projector 120 projecting display signal 125 onto whiteboard 310 in a dark room. Accordingly, an "idealized" model of the projected light and light of the whiteboard writing is:

$$\log c(x,t) = \log p(x,t) + \log w(x,t), \quad (8)$$

where $c(x,t)$ is the camera signal, $p(x,t)$ is portion of light projected by the projector and $w(x,t)$ is the white board writing. After a forward model of $\log p(x,t)$ is determined, it is reduced or subtracted out of $\log c(x,t)$.

In a further embodiment, video cross-talk reducer 250 generates output 155 by reducing an estimated video cross-talk generated from projector 120 projecting display signal 125 onto whiteboard 310 in a room with ambient light that does not change. Accordingly, a model of the projected light and light of the whiteboard writing is:

$$c(x,t) = w(x,t)[p(x,t) + a(x)], \quad (9)$$

where $c(x,t)$ is the camera signal, $p(x,t)$ is portion of light projected by the projector, $w(x,t)$ is the white board writing, and $a(x)$ is ambient light. After a forward model of $p(x,t)$ is determined, it is reduced or subtracted out of $c(x,t)$.

In yet another embodiment, video cross-talk reducer 250 generates output 155 by reducing an estimated video cross-talk generated from projector 120 projecting display signal 125 onto whiteboard 310 in a room with ambient light that does change. Accordingly, a model of the projected light and light of the whiteboard writing is:

$$c(x,t) = w(x,t)[p(x,t) + a(x,t)], \quad (10)$$

where $c(x,t)$ is the camera signal, $p(x,t)$ is portion of light projected by the projector, $w(x,t)$ is the white board writing, and $a(x,t)$ is changing ambient light. After a forward model of $p(x,t)$ is determined, it is reduced or subtracted out of $c(x,t)$.

Synchronization Relationship Determination

Video cross-talk can be further reduced by determining a synchronization relationship between input visual information signal 122 and capture signal 133. Typically, there is an offset (forward or backwards) between when projector 120 receives input visual information signal 122 and when capture device 130 generates capture signal 133 that contains the cross-talk from input visual information signal 122. By taking into account the offset, the reduction in actual video cross-talk is further enhanced.

Figure 4:
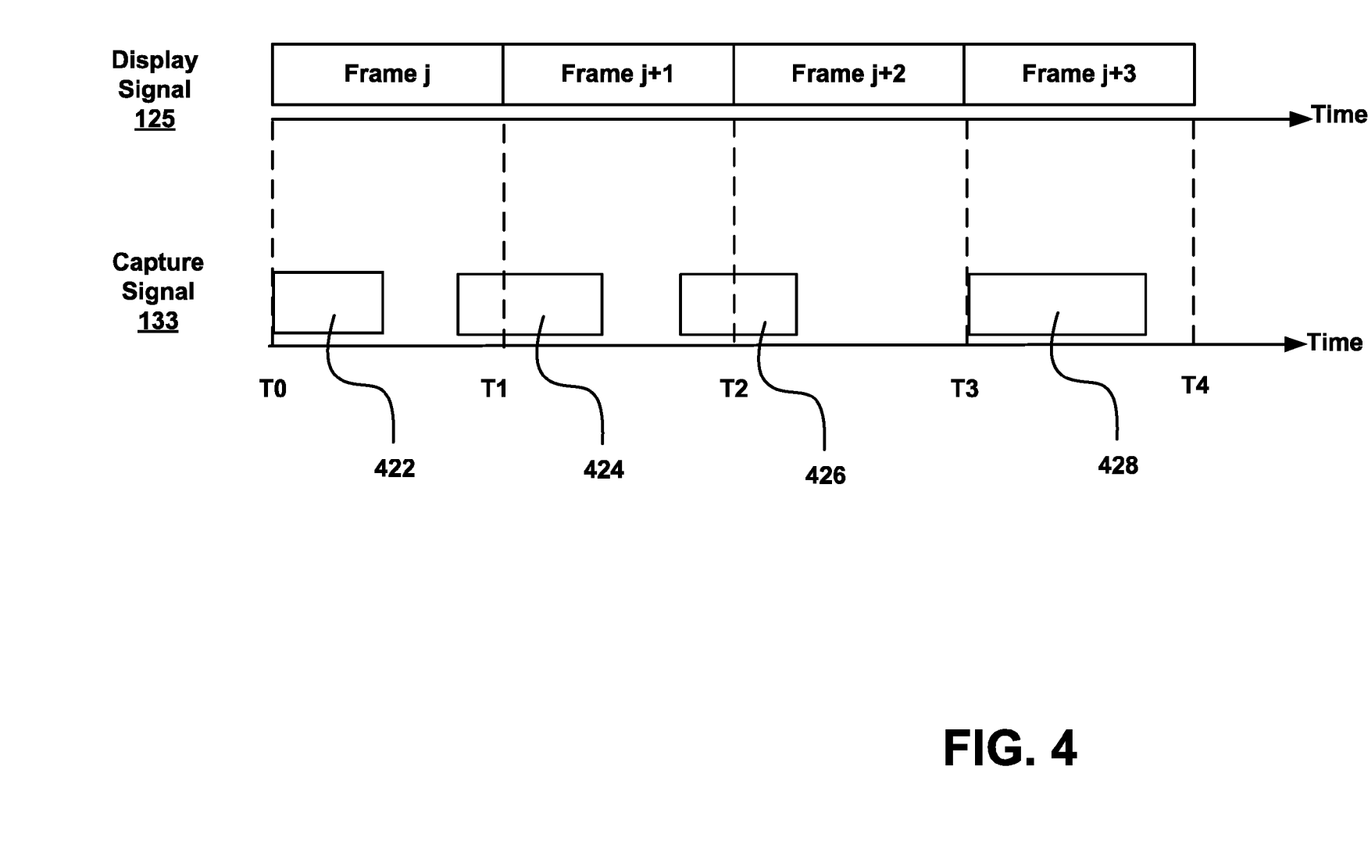
FIG. 4 illustrates an example of synchronization relationship, in accordance with an embodiment of the present invention.

FIG. 4 depicts a synchronization relationship between display signal 125 generated by projector 120 and capture signal 133 generated by capture device 130, in accordance to an embodiment of the present invention. Projector 120 and capture device 130 operate on different clocks. Accordingly, a synchronization relationship such as an offset can occur between visual information signal 122 input to projector 120 and capture signal 133.

In one embodiment, projector 120 receives input visual information signal 122 and transforms it into display signal 125 at a projector frame rate. For example, projector 120 projects frame j at time T0, frame j+1 at T1, frame j+2 at T2, frame j+3 at T3 and so on. It should be appreciated that display signal 125 may involve a time sequential presentation of different colors in input visual information signal 122 and may use a different color space such as RGBW physically implemented using a color wheel, for example. If visual information signal 122 is divided into sequential frames, the projector frame rate may be different from the input frame rate. For example, projector 120 may produce 6 display frames per input frame, or it might produce 24 frames for every 30 input frames. It should also be appreciated that there may be a gap in time between each projected frame, and also that projected frames may be repeated with or without intervening projected frames.

Capture device 130 views display signal 125 according to its own clock. The viewing of display signal 125 by capture device 130 is then generated into capture signal 133.

In particular, a shutter of capture device 130 is open at pulses 422-428 based on the camera frame rate. For example, at pulse 422, the shutter is open and captures frame j. At pulse 424, the shutter is open and captures a portion of frame j and frame j+1. At pulse 426, the shutter is open and captures a portion of frame j+1 and j+2. At pulse 428, the shutter is open and captures frame j+3. It should be appreciated that in other cases capture device 130 may capture portions of three or more sequential frames.

The frame rate of capture device 130, as depicted, is an arbitrary frame rate. Moreover, regardless of the frame rate of capture device 130, the duration the shutter is open can vary as a function of time based on the amount of light.

As such, display signal 125 and capture signal 133 may be unsynchronized due to, but not limited to, a different frame rate between projector 120 and capture device 130 and the duration the shutter is open as a function of time.

Referring to FIG. 2, video cross-talk reducer 250 also includes synchronization relationship determiner (SRD) 260. In one embodiment, video cross-talk reducer 250 does not include SRD 260. For example, SRD 260 is separate from video cross-talk reducer 250.

SRD 260 includes (1) capture signal receiver 261 configured to receive capture signal 133, (2) input visual information signal receiver 262 configured to receive input visual information signal 122, (3) time offset determiner 264 configured to determine a time offset between input visual information signal 122 and capture signal 133, (4) mapping generator 266 configured to generate a mapping between time intervals of input visual information signal 122 and capture signal 133, (5) best match determiner 268 configured to determine a best match between a frame of input visual information signal 122 with a frame of capture signal 133, and (6) best blend determiner 269 configured to determine a best blend for a sequential set of adjacent frames of input visual information signal 122. Optionally, best blend determiner 269 is configured to determine a different best blend for a sequential color presented by display signal 125.

SRD 260 is configured to determine a synchronization relationship between input visual information signal 122 and capture signal 133. The synchronization relationship determination is signal based.

In general, given a combination of a desired signal (e.g., light 131) and an undesired signal (e.g., backscattered light 127), SRD 260 facilitates in extracting the desired signal.

For example, a discrete time signal $s(k)=d(k)+O(u(k-l(k)))$ at discrete time k contains a desired signal $d(k)$ at time k and an undesired signal given by $O(u(k-l(k)))$. The goal is to extract the desired signal $d(k)$ from $s(k)$, given knowledge of $u(k)$. In the equation, shift-invariant operator O is applied to sequence $u(k-l(k))$ with $k \in [-\infty, \infty]$ and the lack of synchronization between desired and undesired signal is reflected by the use of the time-varying time shift $l(k)$. The goal is, given $u(k)$, is to recover the shift $l(k)$ as a function of k. This model encompasses cases where there is time smearing in the undesired signal, as well as capturing deterministic transformations (in O) such as color and geometric transformations in projector-camera systems.

In one embodiment, O is memory-less and corresponds to color and geometric transformations in a projector-camera system. In this embodiment, the solution consists of vector projection of the signal $s(k)$ onto the output of the estimated operator O. Accordingly, $l(k)$ is successfully found and the synchronization information is subsequently used to reduce video cross talk.

In various embodiments, input visual information signal 122 includes audio information. Also, the visual-collaborative system includes a microphone to capture the audio information. For example, capture device 130 includes a microphone. As such, SRD 260 may use the captured audio information independently or in conjunction with input visual information signal 122 to facilitate in determining a synchronization relationship.

SRD 260 facilitates in finding the approximate synchronization offset between input frames $p(m_1, m_2, l)$ and captured camera video $c(n_1, n_2, k)$. For a given camera frame with cross-talk the index $\hat{l}$ is estimated for the best match input frame. In other words, SRD 260 facilitates in determining which frame from input visual information signal 122 is best able to account for the video cross-talk in capture signal 133. In one embodiment, best match determiner 268 determines a best match between a frame of input visual information signal 122 with a frame of capture signal 133.

The forward model is applied to input visual information signal 122 in a buffer of frames to generate the estimate for cross talk signal $\hat{c}_p(n_1, n_2, k)$ and generate the projection $$\hat{l} = \underset{l}{\arg\max} \frac{\sum_{n_1, n_2} d(\hat{c}_p(n_1, n_2, l)) d(c(n_1, n_2, k))}{\sum_{n_1, n_2} d(\hat{c}_p(n_1, n_2, l))^2}, \quad (11)$$

where d( ) is a bandpass filter that detrends and mean-subtracts its input signals, without which spurious matches may occur. Equation 11 is similar to a bank of matched filters, where the filters are the estimates $d(\hat{c}_p(n_1,n_2,l))$ for different l values. The value $\hat{l}$ identifies one of the interfering frames in the unsynchronized system.

In one embodiment, time offset determiner 264 determines a time offset between input visual information signal 122 and capture signal 133. The time offset can be fixed for all frames or may vary from frame to frame.

Mapping generator 266 generates a mapping between time intervals of input visual information signal 122 and capture signal 133. The time intervals may be specified relative to input visual information signal 122 or to display signal 125. For example, the mapping may indicate that a particular frame of capture signal 133 is associated with an interval containing the last 20% of frame j of display signal 125, all of frame j+1 of display signal 125, and 55% of frame j+2 of display signal 125. The mapping may also be stochastic, such as the mean and variance for the frame offsets, or probability distribution for the frame offsets.

SRD 260 may be further improved by taking into account the detailed manner in which video cross-talk arises from at least two sequential input frames. For example, assume that two input frames $p(m_1, m_2, \hat{l})$ and $p(m_1, m_2, \hat{l}+1)$ produce video cross-talk. The forward model of the video cross-talk, $$\hat{c}_p(n_1,n_2k,\alpha) = \alpha f(p(m_1,m_2,\hat{l})) + (1-\alpha)f(p(m_1,m_2,\hat{l}+1)), \quad (12)$$

corresponds to the physical assumption that projector 120 displays $\hat{l}$ for a proportion $\alpha$ of the camera capture time, and for the remaining camera capture time, $1-\alpha$, projector 120 displays $\hat{l}+1$.

To estimate $\alpha$, a total variation measure is used, elsewhere applied for image denoising and restoration. The total variations of a differentiable image $l(x,y)$ is defined by:

$$tv(I(x,y)) \equiv \int_\Omega |\nabla I(x,y)| d\Omega. \quad (13)$$

Approximating tv using the sum of the absolute values and horizontal and vertical differences of a frame, $\alpha$ is determined by minimizing $$\hat{\alpha} = \operatorname*{argmin}_\alpha tv[c(n_1, n_2, k) - \hat{c}_p(n_1, n_2, k, \alpha)]. \quad (14)$$

Signal $c(n_1, n_2, k)$ in equation 2 has edges from desired signal $c_d(n_1,n_2,k)$ and spatially uncorrelated edges from video cross-talk signal $c_p(n_1,n_2,k)$. Minimizing the total variation finds the signal that leaves only the edges of the desired signal. Finding $\hat{\alpha}$ uses a line search of a function generated using simple image differencing operations. In various embodiments, actual implementation involves picking the minimum from two line searches because it is not known whether the frames corresponding to times $\hat{l}$ and $\hat{l}+1$, or $\hat{l}$ and $\hat{l}-1$.

In one embodiment, to reduce video cross-talk, a line search is performed for $\alpha$ for each candidate input frame j. After finding $\alpha_j$, the model gives an improved version of video cross-talk in the camera image which is made up of some blend of input frames j and j+1. When trying to decide which input frame matches the camera image best (instead of using input frames alone), interpolated input frames are used. That is, for interval (j, j+1) the best blend of frame j and j+1 is found. For interval (j+1, j+2), the best blend of frame j+1 and frame j+2 is found, and so on. The best overall winner from the intervals is picked and declared to be the time offset for that interval, thereby providing a more accurate synchronization.

In one embodiment, best blend determiner 269 determines a best blend for a sequential set of adjacent frames of input visual information signal 122, wherein the sequential set of adjacent frames corresponds to a sequential set of adjacent frame intervals. Subsequently, best match determiner 268 determines a best fit or match between the best blend for the sequential set of adjacent frames with a frame of captured signal 133.

Figure 5:
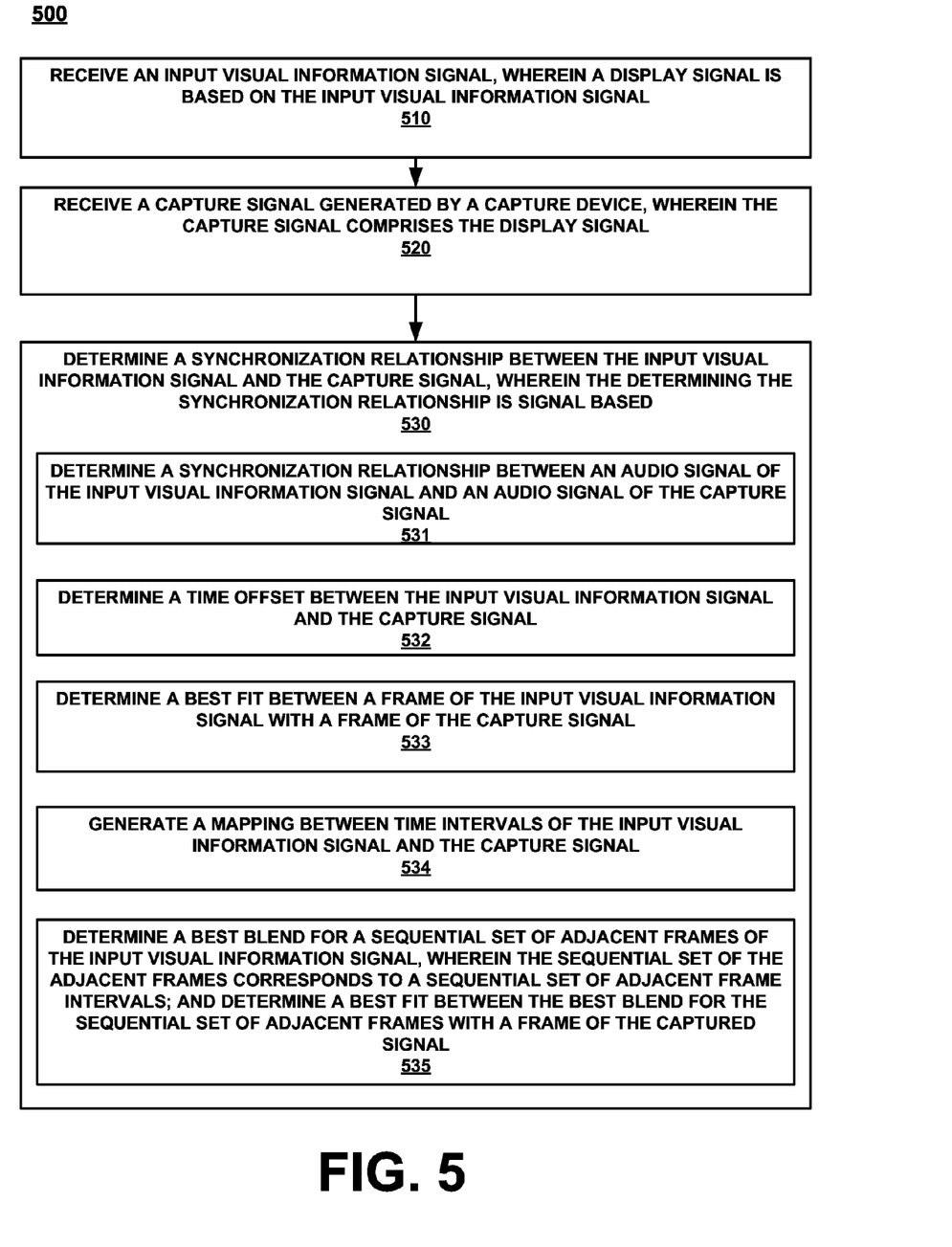
FIG. 5 illustrates an example of a flow chart of a method for determining a synchronization relationship, in accordance with an embodiment of the present invention.

FIG. 5 depicts method 500 for determining a synchronization relationship, in accordance with an embodiment of the present invention. In various embodiments, method 500 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 500 is performed at least by visual collaborative system 100A as described in FIG. 1A.

At 510 of method 500, input visual information signal 122 is received, wherein display signal 125 is based on input visual information signal 122. At 520, capture signal 133 is generated by capture device 130, wherein capture signal 133 comprises display signal 125.

At 530 of method 500, a synchronization relationship is determined between input visual information signal 122 and capture signal 133, wherein the determining the synchronization relationship is signal based. In one embodiment, at 531, a synchronization relationship is determined between an audio signal of input visual information signal 122 and an audio signal of capture signal 133. In another embodiment, at 532, a time offset is determined between input visual information signal 122 and capture signal 133. In a further embodiment, at 533, a best fit is determined between a frame of input visual information signal 122 with a frame of capture signal 133.

In one embodiment, at 534, a mapping is generated between time intervals of input visual information signal 122 and the capture signal 133. In another embodiment, at 535, a best blend is determined for a sequential set of adjacent frames of input visual information signal 122, wherein the sequential set of the adjacent frames corresponds to a sequential set of adjacent frame intervals; and a best fit is determined between the best blend for the sequential set of adjacent frames with a frame of captured signal 122.

Various embodiments of the present invention are thus described. While the present invention has been described in particular embodiments, it should be appreciated that the present invention should not be construed as limited by such embodiments, but rather construed according to the following claims.

The invention claimed is:
1. A visual collaborative system comprising:
    a partially transmissive display to output transmissive data and source data, the transmissive data corresponding to visual data transmitted through the partially transmissive display, the source data associated with collaborative content displayed on the partially transmissive display;

a capture device to receive the transmissive data and the source data and output a capture signal; and a cross-talk reduction component to:
receive the capture signal and a remote signal, the remote signal comprising the collaborative content to be displayed on the partially transmissive display;
using the remote signal, reduce cross-talk between the transmissive data and the source data to generate a corrected signal; and
output the corrected signal to one or more remote participants, the corrected signal comprising the captured signal with reduced cross-talk.

2. The visual collaborative system of claim 1, wherein the source data comprises remote visual data generated on the partially transmissive display based on the remote signal.

3. The visual collaborative system of claim 1, further comprising:
a projector to receive the remote signal and project the collaborative content onto the partially transmissive display;
wherein the source data comprises reflected light, corresponding to the projected collaborative content, from the partially transmissive display.

4. The visual collaborative system of claim 3, wherein reducing the cross-talk comprises forward modeling the remote signal to estimate the cross-talk of the reflected light affecting the capture signal.

5. The visual collaborative system of claim 4, wherein reducing the cross-talk further comprises subtracting the estimated cross-talk from the capture signal.

6. The visual collaborative system of claim 4, wherein forward modeling the remote signal comprises (i) mapping the remote signal to a projected signal output from the projector, (ii) mapping the projected signal to the reflected light from the partially transmissive display, and (iii) mapping the reflected light received by the capture device to the capture signal output by the capture device.

7. The visual collaborative system of claim 3, wherein reducing the cross-talk comprises determining a synchronization relationship between the projected collaborative content and the capture signal.

8. The visual collaborative system of claim 7, wherein the projector operates on a first clock and the capture device operates on a second clock, and wherein determining the synchronization relationship comprises determining an offset based on a time difference between the first clock and the second dock.

9. The visual collaborative system of claim 1, wherein reducing the cross-talk comprises matching frames between the remote signal and the capture signal received by the cross-talk reduction component.

10. The visual collaborative system of claim 1, wherein reducing the cross-talk comprises processing the remote signal and the capture signal to determine a best blend for a sequential set of adjacent frames between the remote signal and the capture signal.

11. A method for reducing cross-talk comprising:
receiving, via a cross-talk reduction component of a visual collaborative system, a remote signal comprising collaborative content to be displayed on a partially transmissive display;
receiving, via the cross-talk reduction component, a capture signal corresponding to visual data transmitted through the partially transmissive display, and source data associated with the collaborative content displayed on the partially transmissive display;
using the remote signal, reducing, by the cross talk reduction component, cross-talk between the transmissive data and the source data to generate a corrected signal; and
outputting, by the cross-talk reduction component, the corrected signal to one or more remote participants, the corrected signal comprising the captured signal with reduced cross-talk.

12. The method of claim 11, wherein the source data comprises remote visual data generated on the partially transmissive display based on the remote signal.

13. The method of claim 11, wherein the collaborative content is projected onto the partially transmissive display by a projector based on the remote signal, and wherein the source data comprises reflected light, corresponding to the projected collaborative content, from the partially transmissive display.

14. A non-transitory computer-readable medium storing instructions for reducing cross-talk, wherein the instructions, when executed by one or more processors of a cross-talk reduction component, cause the cross-talk reduction component to:
receive a remote signal comprising collaborative content to be displayed on a partially transmissive display;
receive a capture signal corresponding to visual data transmitted through the partially transmissive display, and source data associated with the collaborative content displayed on the partially transmissive display;
using the remote signal, reduce cross-talk between the transmissive data and the source data to generate a corrected signal; and
output the corrected signal to one or more remote participants, the corrected signal comprising the captured signal with reduced cross-talk.

15. The non-transitory computer-readable medium of claim 14, wherein the source data comprises remote visual data generated on the partially transmissive display based on the remote signal.

* * * * *